UNITED STATES PATENT OFFICE.

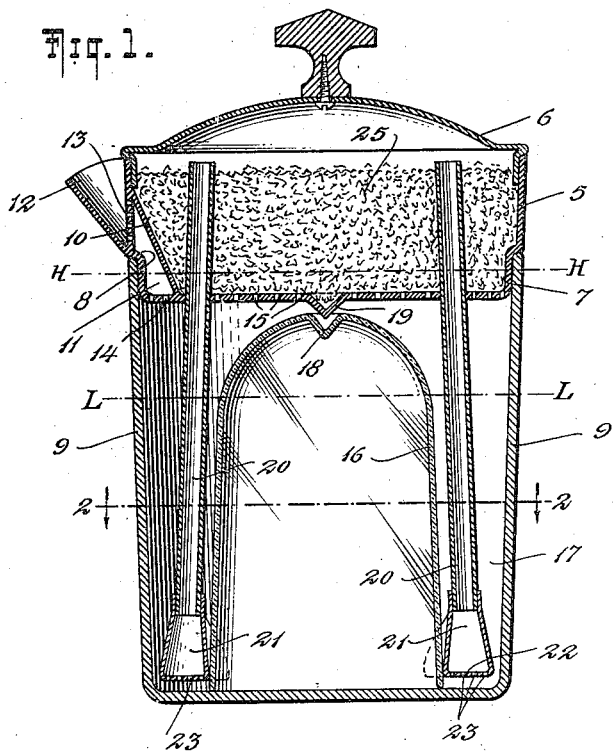

ARTHUR HAMMERSTEIN, OF NEW YORK, N. Y.

COFFEE-PERCOLATOR.

1,267,405.

Specification of Letters Patent.

Patented May 28, 1918.

Application filed May 26, 1916. Serial No. 99,952.

*To all whom it may concern:*

Be it known that I, ARTHUR HAMMERSTEIN, a citizen of the United States, and resident of the borough of Manhattan, city, county, and State of New York, have invented certain new and useful Improvements in Coffee-Percolators, of which the following is a specification.

My invention relates to coffee percolators and has for its object to provide a construction in which the percolating operation is carried out with a maximum of efficiency and in which the finished coffee is maintained in a heated condition for a much longer time than in existing constructions. My improvement will be fully described hereinafter and the features of novelty will be pointed out in the appended claims.

In the accompanying drawings, which illustrate an example of my invention, Figure 1 is a sectional elevation of my improved percolator; and Fig. 2 is a horizontal section thereof on the line 2—2 of Fig. 1.

As shown in the illustrated example my improved percolator comprises a container 5 which is preferably open at the top as shown in Fig. 1 and normally closed by means of a cover 6 movable to and from an open position. The said container 5 preferably includes a reduced portion 7 forming an annular shoulder 8, and of a diameter or size to snugly and frictionaly fit within the open end of a receptacle 9, said shoulder 8 resting upon the end of the receptacle whereby the container is supported upon the receptacle and detachably combined therewith. The said container 5 and receptacle 9 may be constructed of any suitable material adapted for the purpose in hand. The container is provided with a partition 10 which forms a separate passage 11 therein, said passage communicating with a spout 12 through perforations 13 and with the interior of the receptacle 9 through perforations 14 and having no direct connection with the interior of the container 5. The latter is further provided in its bottom with perforations 15 whereby communication between the interiors of the container 5 and receptacle 9 is established as shown in Fig. 1. As shown in the illustrated example my improved percolator further includes a hollow member or cup 16 which is located within the receptacle 9 in an inverted condition and preferably rests upon the bottom thereof, said cup 16 being open at the bottom and otherwise completely closed and forming with the receptacle 9 an annular space 17. This hollow member or cup 16 is preferably constructed of glass or some other material which is a poor conductor of heat and at its upper closed end is provided with an external recess 18 into which loosely fits a rigid projection 19 depending from the bottom of the container 5. The purpose of this arrangement will appear more fully further on in the description. In addition to the elements so far described my improved percolator comprises a pair of tubes 20 the upper open ends of which are located within the container 5 at a distance above the bottom thereof and which project through the bottom of said container and are preferably carried thereby. The lower ends of said tubes 20 carry chambers or hollow elements 21 which have their bottoms 22 perforated as indicated at 23, the tubes 20 being of such length that the bottoms 22 of said chambers will be located in close proximity to the bottom of the receptacle 9 when the parts are assembled as shown in Fig. 1. In order to increase the area of the bottoms 22 to a maximum extent consistent with the dimensions of the percolator, the said chambers have a curved form when viewed in plan as shown in Fig. 2 and converge upwardly toward the tubes 20, it being understood that the interiors of the chambers 21 and tubes 20 are in communication with each other. With the described and illustrated arrangement the tubes 20 extend downwardly into the annular space 17 between the hollow member or cup 16 and the receptacle 9, said chambers 21 being thus located in said space 17 near the bottom thereof as shown in Fig. 1. A suitable handle 24 may be provided for manipulating the percolator when it is desired to pour the finished coffee.

In operation the coffee 25 in a ground or powdered condition is placed within the container 5 preferably in such amount that the upper level thereof is somewhat below the upper ends of the tubes 20, and the receptacle 9 is filled with either hot or cold water up to about the line L. The hollow member or cup 16 in an inverted condition, is then placed within the receptacle 9, thus causing a displacement of the water to about the line H, owing to the fact that the air within the cup 16 cannot escape, after which the container 5 is placed in an operative position, by inserting or fitting the reduced portion 7 into the upper end of the receptacle 9. The complete percolator is then placed upon a stove or over a flame whereby the water is finally brought to the boiling point and at the same time the air confined within the cup 16 is heated and expanded and thus bubbles through the boiling water and escapes to the atmosphere thereby reducing the quantity of air materially within said cup 16. As the water in the receptacle 9 continues to boil it passes up through the perforations 23 into the chambers 21 and continues up through the tubes 20 and finally percolates back through the coffee 25 and perforations 15 into the receptacle 9, the circulation being maintained as long as the water continues to boil. During its passage through the coffee the boiling water extracts the soluble parts therefrom as will be readily apparent and finally results in converting all of the water in the receptacle 9 into finished coffee, free from insoluble matter, the strength of the coffee depending upon the length of time that the percolation is continued and being thus optional with the user of the percolator. As soon as the coffee of the desired strength is had, the percolator is removed from the stove or the flame which results in a discontinuance of the above mentioned circulation and cessation of the percolation and at the same time brings about a gradual cooling of the air remaining within the cup 16. As this remaining air cools it also contracts and owing to its lesser quantity forms a vacuum within said cup 16 which causes the finished coffee to be drawn or forced into the latter. The parts are preferably so proportioned that a small amount of coffee will always remain exteriorly of the cup 16 at the bottom of the receptacle 9 to form a liquid seal about the lower edge of said hollow member or cup so that the major portion of the coffee which is within said cup is sealed against direct contact with the atmosphere. Owing to the poor heat conducting properties of the material of which the member or cup 16 is constructed the coffee within the same is maintained in a heated condition for a considerable length of time.

When it is desired to pour the coffee the percolator is tilted in the usual manner by means of the handle 24, the cup or member 16 tilting relatively to the receptacle 9 owing to the loose fit of the projection 19 in the recess 18 and thus permitting the coffee to escape from within said member 16 and air to enter and replace the same. The coffee passes out of the receptacle 9 through the perforations 14, passage 11 and perforation 13 and finally flows out of the spout 12 and is thus substantially protected from contact with the coffee 25 during pouring so that the tendency to carry along coffee grounds or other solid matter is reduced to a minimum.

My improvement is extremely simple in construction, is inexpensive to produce or manufacture and may readily be kept clean and in a sanitary condition as all of the component parts are readily separable and easy to scour.

Various changes in the specific form shown and described may be made within the scope of the claims without departing from the spirit of my invention.

I claim:—

1. A coffee percolator comprising a receptacle, percolating means combined therewith and an inverted cup resting upon the bottom of said receptacle and having a freedom of movement independent of the receptacle and percolating means.

2. A coffee percolator comprising a receptacle, percolating means combined therewith and an open ended chamber of poor heat conducting material located within said receptacle in an inverted condition and into which the major portion of the finished coffee is transferred by atmospheric pressure at the completion of the percolation and means for permitting a limited tilting of said chamber relatively to said receptacle whereby the coffee is permitted to escape from said chamber into said receptacle.

3. A coffee percolator comprising a receptacle, a container for the ground or powdered coffee detachably connected with said receptacle and having a perforated bottom, a plurality of tubes extending into said container and through the coffee therein, perforated hollow members carried by said tubes and located near the bottom of said receptacle and an inverted cup located within said receptacle and having its open end resting upon the bottom thereof between said perforated hollow members.

4. A coffee percolator comprising a receptacle, a container for the ground or powdered coffee detachably connected with said receptacle and having a perforated bottom, a plurality of tubes extending into said container and through the coffee therein, perforated hollow members carried by said tubes and located near the bottom of said receptacle, an inverted cup located within said receptacle and having its open end resting upon the bottom thereof between said perforated hollow members, said cup being provided at its closed end with an exterior recess and a projection depending from said container and loosely fitting into said recess and permitting a limited tilting of said cup relatively to said receptacle.

In testimony whereof I have hereunto set my hand.

ARTHUR HAMMERSTEIN.

Copies of this patent may be obtained for five cents each, by addressing the "Commissioner of Patents, Washington, D. C."